United States Patent
Bessac et al.

(10) Patent No.: US 10,232,602 B2
(45) Date of Patent: Mar. 19, 2019

(54) METHOD AND APPARATUS FOR PRODUCING THREE-DIMENSIONAL OBJECTS WITH IMPROVED PROPERTIES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Christophe Bessac, Clermont-Ferrand (FR); Stephanie Verleene, Clermont-Ferrand (FR); Frederic Pialot, Clermont-Ferrand (FR); Gilles Walrand, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 662 days.

(21) Appl. No.: 14/380,869

(22) PCT Filed: Feb. 19, 2013

(86) PCT No.: PCT/EP2013/053237
§ 371 (c)(1),
(2) Date: Aug. 25, 2014

(87) PCT Pub. No.: WO2013/127655
PCT Pub. Date: Sep. 6, 2013

(65) Prior Publication Data
US 2015/0064048 A1    Mar. 5, 2015

(30) Foreign Application Priority Data
Feb. 27, 2012  (FR) ...................... 12 51744

(51) Int. Cl.
*C21D 1/00* (2006.01)
*B22F 3/105* (2006.01)
(Continued)

(52) U.S. Cl.
CPC ............ *B33Y 10/00* (2014.12); *B22F 3/1055* (2013.01); *B22F 3/24* (2013.01); *B22F 5/007* (2013.01);
(Continued)

(58) Field of Classification Search
CPC ...................................... B33Y 10/00
See application file for complete search history.

(56) References Cited

U.S. PATENT DOCUMENTS 6,203,861 B1 * 3/2001 Kar .................. B22F 3/1055
264/497
7,286,893 B1 * 10/2007 Mazumder ............ B23K 26/34
219/121.66
(Continued)

FOREIGN PATENT DOCUMENTS

CN        101607311 A  * 12/2009
DE       102007056984       5/2009
(Continued)

OTHER PUBLICATIONS

International Search Report for PCT/EP2013/053237 dated Jul. 12, 2013.

*Primary Examiner* — Christopher S Kessler
*Assistant Examiner* — Jeremy C Jones
(74) *Attorney, Agent, or Firm* — Dickinson Wright PLLC

(57) ABSTRACT

Method for fabricating a three-dimensional object by successive consolidation, layer by layer, of selected regions of a layer of powder, consolidated regions corresponding to successive sections of the three-dimensional object, comprising in order:

(Continued)

a—deposit layer of powder onto a support;
b—fuse the layer of powder by a first laser energy source so as to obtain a fused layer corresponding to the section of the object and exhibiting a first state of its mechanical properties,
c—heat at least a part of the fused layer by a second electron beam energy source to a temperature which follows a controlled variation over time so as to modify the first state of the fused layer and to obtain a consolidated layer with improved mechanical properties,
d—repeat the preceding steps until several superposed consolidated layers are formed with improved properties forming the object.

13 Claims, 4 Drawing Sheets

(51) Int. Cl.
*B22F 3/24* (2006.01)
*B22F 5/00* (2006.01)
*B33Y 10/00* (2015.01)
*B33Y 30/00* (2015.01)
*B33Y 40/00* (2015.01)
*B29C 64/153* (2017.01)
*B33Y 80/00* (2015.01)

(52) U.S. Cl.
CPC ............ *B29C 64/153* (2017.08); *B33Y 30/00* (2014.12); *B33Y 40/00* (2014.12); *B22F 2003/1056* (2013.01); *B22F 2003/1057* (2013.01); *B22F 2003/248* (2013.01); *B33Y 80/00* (2014.12); *Y02P 10/295* (2015.11)

(56) References Cited

U.S. PATENT DOCUMENTS

| | | | |
|---|---|---|---|
| 8,309,092 B2 * | 11/2012 | Qian | ............... C07K 16/18 424/142.1 |
| 2009/0152771 A1 | 6/2009 | Philippi et al. | |
| 2012/0217226 A1 | 8/2012 | Bayer et al. | |
| 2013/0055568 A1 | 3/2013 | Dusel et al. | |

FOREIGN PATENT DOCUMENTS

| | | | | |
|---|---|---|---|---|
| DE | 102007059865 | * | 6/2009 | ............ B22F 3/1035 |
| DE | 102009051551 | | 5/2011 | |
| DE | 102010011059 | | 9/2011 | |
| EP | 2292357 A1 | | 3/2011 | |
| WO | 01/81003 | | 11/2001 | |

* cited by examiner

METHOD AND APPARATUS FOR PRODUCING THREE-DIMENSIONAL OBJECTS WITH IMPROVED PROPERTIES

This application is a 371 national phase entry of PCT/EP2013/053237, filed 19 Feb. 2013, which claims benefit of FR 1251744, filed 27 Feb. 2012, the entire contents of which are incorporated herein by reference for all purposes.

BACKGROUND

1. Field

The present disclosure relates to a method and a device for fabricating three-dimensional objects with improved properties by successive consolidation, layer by layer, of the areas selected from a layer of material in powder form, the consolidated regions corresponding to successive sections of the three-dimensional object. Such a fabrication method, also known under the name of powder-based additive fabrication, forms partially or totally, layer by layer, a sintering or a fusion of the grains of powder using electromagnetic radiation (for example a laser beam) or a beam of particles (for example an electron beam).

2. Description of Related Art

One example of a device for producing a three-dimensional object layer by layer starting from a material in powder form by selective fusion of powder using a laser beam is known from the document U.S. Pat. No. 4,863,538. The document WO 0181031 describes a device for fabricating a three-dimensional object by a powder-based additive fabrication method which uses an electron beam. The objects obtained generally have complex shapes and exhibit a reasonably good geometrical precision. However, depending on their use, these objects must sometimes undergo additional operations which are aimed at improving their resistance to wear, to fatigue or to the mechanical stresses to which they are subjected.

The objects fabricated must satisfy the conditions of operation or of use, notably by exhibiting a good resistance to the various mechanical stresses. The mechanical properties of a component can vary depending on the geometry of the component and on the type of stresses to which it is subjected. Thus, a component must, for example, exhibit high-strength mechanical characteristics over regions of limited extent, on the surface, whereas the bulk of the component must exhibit a high ductility. These mechanical properties are obtained by subjecting the component to a heat treatment.

The mechanical stability of the surface is important notably when the objects fabricated must exhibit a good resistance to fatigue or to wear. In general, the mechanical properties of resistance to fatigue or to wear of the objects fabricated are improved by surface heat treatments. Surface heat treatments most frequently use heat treatment installations comprising induction devices. However, the treatment carried out with these installations can cause deformations within the treated components. It has furthermore been observed that, for the objects with complex geometric shapes, the desired parameters for the heat treatment could not be ensured in all the sections of the object using conventional treatment methods.

In order to overcome these drawbacks, it is also known for the surface treatment of the objects to be applied by means of high energy density beams, such as laser beams or electron beams. These treatments are more particularly suited to components having complex geometries, such as the majority of components obtained by powder-based additive fabrication methods.

The document DE 100 07 962 describes such a powder-based additive fabrication method which uses a laser beam in order to solidify the grains of powder, layer by layer, so as to obtain an injection molding element. The component obtained has a high roughness and, for this reason, its surface is subsequently subjected to a surface finishing operation carried out by means of a second laser beam which effects a surface fusion of certain regions of its surface in order to reduce its roughness. The use of the second laser beam in this document is limited to a superficial fusion of the finished component.

The document WO 02/11928 describes a method for obtaining precision components by a method for additive fabrication based on a mixture of powders, using a laser beam, the component being subsequently subjected to heat treatments. The heat treatments described are aimed at rendering the structure uniform, at relieving the internal stresses, at eliminating the defects or at improving the surface condition. These treatments are carried out by subjecting the component obtained to an additional sintering then a slow cooling cycle in an oven. This assumes the implementation of separate treatment means that are remote from those of the fabrication, which implies that a treated component is obtained after a long period of time, in view of the quite long treatment times to which are added the time for transferring the components between the fabrication station and that for the treatment.

The document DE 10 2007 059 865 describes another method for obtaining a metal component by a powder-based additive fabrication method using a laser beam. According to this document, the metallographic properties of the component are locally modified within the component thus obtained by a reheating of the molten region by means of an element heating by infrared radiation or by means of a laser beam. An improvement in the hardness, in the tenacity or in the resistance of the component is thus obtained. This document has the main drawback of the length of time needed to obtain the component, notably when the same laser is used firstly for solidifying and subsequently for performing the heat treatment of the latter.

From the document U.S. Patent No. 2011/0165339, a method and a device are furthermore known for fabricating three-dimensional objects which are at least in part composed of a composite of crystalline metal within a matrix of amorphous metal. Such an object is formed by depositing a material in powder form, layer by layer, which deposition is followed by a local solidification of this material by fusion with a laser beam or with an electron beam and by a controlled cooling of the fused region. The power of the source and the speed of travel of the beam over an area of limited dimensions of the layer of powder are chosen in such a manner that by varying the speed of cooling of the treated area, the latter can adopt a crystalline or amorphous structure. The device described in this document employs a single source of energy whose emitted beam treats very small regions, while often changing position, a fact which lengthens the fabrication time for a component. For this reason, this device is not suitable for the fabrication of components with medium or large dimensions, nor for high-volume manufacturing.

SUMMARY

One aim of embodiments of the invention is to overcome these drawbacks and to provide an improved method and a faster and higher-performance device for fabricating three-dimensional objects by selective fusion of powder with a high precision and whose mechanical properties are improved, while at the same time being precisely defined for each section of the object.

Another aim of embodiments of the invention is to provide an improved method and a high-performance device allowing three-dimensional objects to be obtained that have complex shapes and exhibit improved mechanical properties with a good productivity.

These are among the goals that are achieved with a method for fabricating a three-dimensional object by successive consolidation, layer by layer, of the selected regions of a layer of powder, the consolidated regions corresponding to successive sections of the three-dimensional object, the method comprising the following steps taken in order:

a—deposit a layer of powder onto a support;

b—fuse the said layer of powder by means of a first laser beam energy source in such a manner as to obtain a fused layer corresponding to the section of the object and exhibiting a first state of its mechanical properties, c—heat at least a part of the fused layer by means of a second electron beam energy source to a temperature which follows a controlled variation over time in such a manner as to modify the said first state of the fused layer and to obtain a consolidated layer with improved mechanical properties, d—repeat the preceding steps until several superposed consolidated layers are formed with improved properties forming the said object.

The method of these embodiments of the invention therefore allows a three-dimensional object to be fabricated by a technique of powder-based additive fabrication by carrying out, layer by layer, the fusion of the powder with a laser beam coming from a first source of energy, which is a laser source, and subsequently a heat treatment of the fused layer, over all or a part of the latter, using an electron beam coming from a second source of energy which is an electron gun. A fused layer is thus obtained whose geometrical shape and dimensions after fusion by laser are very precise, this layer being subsequently heat treated in an efficient manner by an electron beam. The electron beam is more powerful than a laser beam; it enables a higher speed scanning and a better control of the surface of the powder layer than the laser beam, and its energy is absorbed more readily by the material of the layer. This allows a consolidated treated layer to be obtained rapidly and precisely with improved mechanical properties.

Owing to the fact that the heat treatment is performed layer by layer, the metallographic structure of each layer is thus better controlled. Thus, by the controlled displacement of the electron beam, of a given intensity, at a pre-established speed, over the surface of the fused layer, the temperature of the latter is able to follow a controlled variation as a function of time. The electron beam thus provides the rise in temperature, the maintenance at a given temperature or the cooling of the fused region according to the chosen heat treatment. The cooling which follows the heating is conditioned by the parameters of the electron beam (speed of travel, power) and by the volume of surrounding material which is not affected by the heat and which thus allows the heat generated to be evacuated. The management of the heating and of the cooling after fusion is thus effectively ensured by the electron beam in such a manner that the mechanical properties sought for each section (or consolidated layer) of the object can be obtained, which allows a longer additional operation for treatment of the finished object to be avoided.

Moreover, by applying the heat treatment to each layer and by using a beam different from that which carries out the fusion, a significant gain in time is obtained, because the treatment may be carried out in dead time, for example by applying the electron beam to regions of the layer that are already fused and while the laser beam is fusing other regions of the same layer.

Preferably, the heating by electron beam performs a heat treatment in the solid phase of the fused layer which is chosen from amongst the following treatments, taken alone or in combination: stabilization annealing, tempering, bulk quenching, surface quenching.

Heat treatment in the solid phase consists in applying structural transformations within the fused layer, or within a part of the latter, by means of pre-established cycles for raising the temperature, to a temperature less than that of fusion, for maintaining it and for a controlled cooling, in order to modify the mechanical properties.

Thus, a stabilization annealing is carried out by applying, by means of the electron beam, a uniform heating, holding at a constant temperature and a slow cooling of the layer fused by laser. The annealing can be applied over the entire surface of the fused layer and allows the internal stresses that appeared after fusion to be relieved and a consolidated treated layer to be obtained without deformations and whose geometry is complied with. Such a treatment also allows the skin (or external surface which surrounds the bulk of the object over a given thickness, which thickness is in the range between a few tenths of mm and a few mm) to be put under compression, which leads to an improvement in the resistance to wear and to fatigue by reclosing the cracks and by limiting the propagation of fusion fissuring.

A tempering heat cycle is composed of an increase in temperature, of a period at constant temperature and of a slow cooling. Several types of tempering cycle are known:

hardening tempering which allows the formation of precipitates that will harden the material (for example in the case of a maraging steel)

relief tempering which allows the internal stresses to be reduced after quenching, re-establishing the impact toughness, and making the treated material less fragile and more ductile.

Such a tempering cycle may be carried out by applying the electron beam onto the periphery of the layer fused by laser, over a localized region of the fused layer or over the entire surface of the latter. The electron beam allows a controlled variation in the temperature as a function of time to be ensured in the treated layer, according to a tempering curve specific to the chosen material, in such a manner as to obtain a modification of the metallographic structure of the layer.

A quenching treatment is carried out by modulating the intensity and the speed of travel of the electron beam in order to obtain a rise to a high temperature followed by a rapid cooling. Such a quenching may be superficial, hence carried out within the skin of the object being fabricated, or within the bulk, hence applied to the core of the object. Quenching in the bulk is generally followed by one or more tempering cycles, the tempering temperatures being lower than those of the quenching. Quenching enables a hardening of the structure to be obtained.

Advantageously, the power and the speed of travel of the electron beam with respect to the object to be fabricated are chosen according to the material of the latter. This implies that the temperature curve is to be chosen according to the composition of the material to be treated and subsequently the variation of the temperature over time within each treated layer in order to obtain the desired mechanical properties for the object.

Preferably, the focusing of the electron beam, its displacement and its power are continuously controlled. This allows the tracking of the variation of the temperature as a function of time to be ensured in the treated layer and hence the desired heat treatment to be obtained.

In one advantageous embodiment of the invention, the two beams move simultaneously over a common path, the laser beam being in advance with respect to the electron beam, such as seen in the direction of displacement of the said beams with respect to the said object. This allows a consolidated layer treated by the electron beam to be obtained at the same time as the fusion by laser beam for a further improved productivity.

Preferably, the center of gravity of the impact area of the electron beam is situated behind with respect to the center of gravity of the impact area of the laser beam as seen in the direction of the displacement of the said beams with respect to the object. Advantageously, the distance between the center of gravity of the impact area of the electron beam and the center of gravity of the point of impact of the laser beam is determined according to the material and to the granulometry of the powder layer. This allows the temperature transition between the first very hot region due to the fusion by laser beam and the second region heated by the electron beam to be better controlled in terms of temperature gradient and also within the space in question (relative surface area and thickness).

Preferably, the power and the diameter of the laser beam and of the electron beam are adjustable in order to be better able to adapt them to the conditions of geometrical precision and to the desired mechanical properties for the object.

Preferably, the said powder is a metal powder. After tests carried out in the laboratory, it has been observed that the method of the invention lends itself very well to the fabrication of metal components with a high precision and excellent mechanical properties.

Advantageously, the said three-dimensional object is a mold or a part of a mold for the fabrication of a tire. The method of the invention allows components with a complex shape to be fabricated and is more particularly suited to the fabrication of a mold or of a part of a mold for a tire, such a mold lining having elements with small dimensions, such as platelets or bands.

The goals of embodiments of the invention are also achieved with a device for fabricating a three-dimensional object by successive consolidation, layer by layer, of the selected regions of a layer of powder, the consolidated regions corresponding to successive sections of the three-dimensional object, the said device comprising:
  means of support for the said object;
  distribution means designed to apply a layer of powder onto the said support or onto a previously consolidated layer of the said object;
  a first laser energy source designed to fuse the layer of powder applied by the said distribution means;
  a second electron beam energy source designed to heat the layer of powder fused by the laser beam;
  first displacement means which apply a relative movement of the radiation of the said first laser beam source with respect to the object along a given path in such a manner as to obtain a fused layer;
  second displacement means which apply a relative movement of the radiation from the said second electron beam source with respect to the object along a given path in such a manner as to heat at least a part of the said fused layer to a temperature which follows a controlled variation over time in order to obtain a consolidated layer with improved mechanical properties;
  a memory in which data are stored relating to the variation of the temperature as a function of time during the generation of each consolidated layer of the object;
  a control unit designed to control the operation of the said sources and of the said displacement means according to a fusion strategy and to the data coming from the said memory.

Advantageously, the means and sources of energy are placed inside a chamber under vacuum. This enables the efficient operation of two sources of energy using electron and laser beams in a common chamber, while at the same time preventing the phenomena of oxidation during the laser fusion or of dispersion of electrons and ensuring the evacuation of the gases coming from the operations carried out during the fabrication of the object.

Advantageously, the device of an embodiment of the invention comprises means for measuring the temperature of the layer of powder connected to the said control unit. This allows the operating parameters of the electron beam source to be more finely adjusted.

Laser beam source is understood to mean at least one such source and electron beam source is understood to mean at least one such source, several sources being able to be used in combination in the method and in the device of the invention.

BRIEF DESCRIPTION OF DRAWINGS

The embodiments of the invention will be better understood thanks to the following part of the description, which is supported by the following figures.

DETAILED DESCRIPTION OF SPECIFIC EMBODIMENTS

In the various figures, identical or similar elements carry the same reference. Their description is not therefore systematically repeated. It should furthermore be noted that the thicknesses of the layers, the dimensions of the beams of radiation or those of the object formed are not shown at a coherent scale but, on the contrary, intentionally falsified with the aim of rendering the figures readable.

Figure 1:
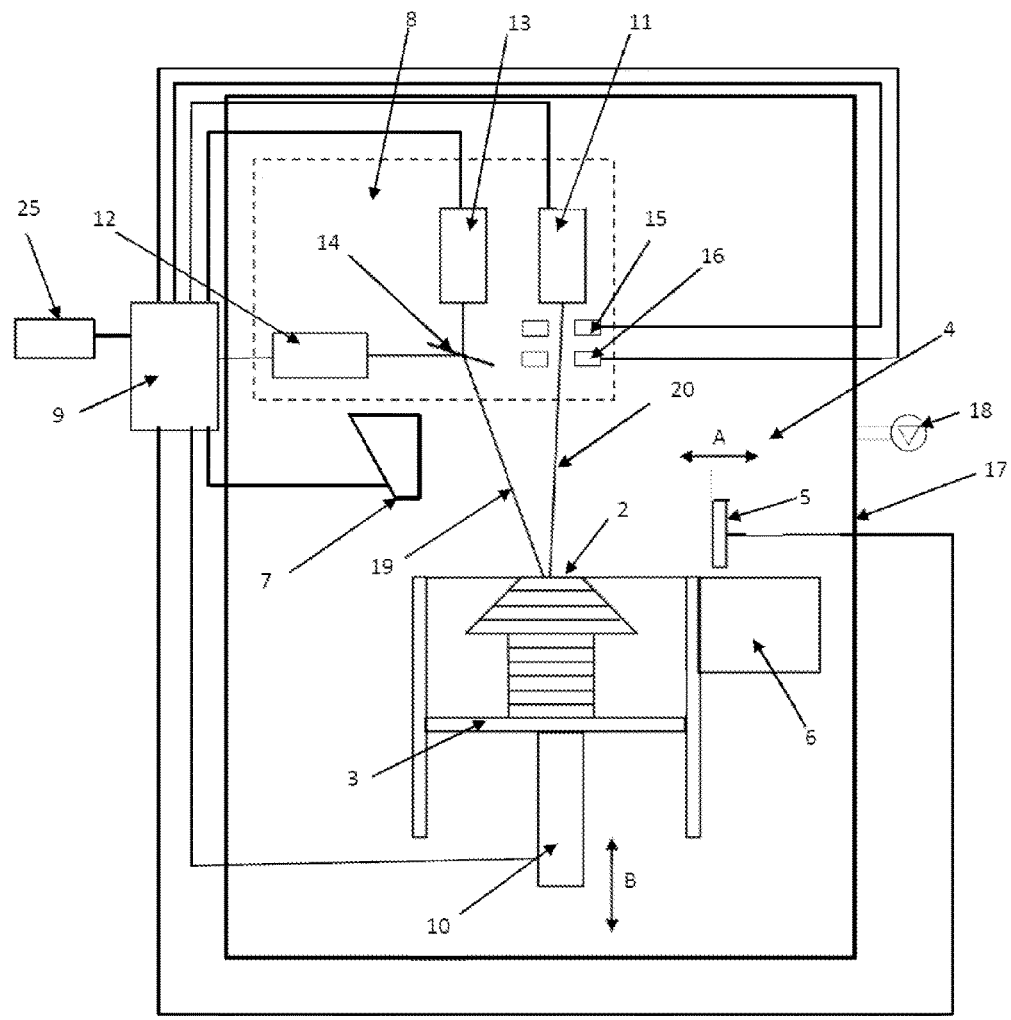
FIG. 1 is a cross-sectional view showing schematically a device for fabricating a three-dimensional object according to an embodiment of the invention.

FIG. 1 illustrates a device 1 for fabricating a three-dimensional object 2. The device comprises a horizontal carrier plate 3 on which the object 2 is constructed for which it forms a support. The device also comprises powder distribution means 4, coming from a reservoir of powder 7 situated on top of the carrier plate 3, the said distribution means being designed to apply a fine layer of powder onto the carrier plate 3, for example by means of a scraper 5. The scraper 5 is set in motion by actuation means (not shown) so as to perform an alternating translational movement in a horizontal plane, according to the double arrow A, on top of the carrier plate 3. Thus, the scraper 5 spreads the powder into a thin layer, starting from the exit of the reservoir 7, the surplus of powder being pushed by the scraper 5 into a recovery recipient 6. The scraper 5 is preferably brought back into its initial position near to the exit of the reservoir 7 prior to the start of a new cycle for forming a layer of the powder. In one variant, a device for compacting the layer of spread out powder (not shown on the drawings) may also be provided. The layer of powder thus spread onto the carrier plate 3 thus forms a layer which is selectively fused by means of one or more energy beams coming from an assembly of sources of energy 8. The three-dimensional object 2 is fabricated by a selective fusion or a selective sintering of powder and is constructed by superposition of the layers on the basis of a modelling of the object by a computer. The energy beam (or the energy beams) is (are) controlled by a microprocessor of a control unit 9 comprising the modelling of the object for fabricating the object by successive fusion or sintering of superposed layers of powder. During a cycle for fabrication of the object, the carrier plate 3 is regularly lowered, after consolidation of each layer of powder, by a distance equal to the thickness of the consolidated layer of powder. For this purpose, the carrier plate 3 is connected to a mechanism for driving in a vertical translational movement, according to the double arrow B, for example by connecting the vertical shaft 10 supporting the carrier plate 3 to a mechanism of the rack and pinion or screw and nut type actuated by a servo-motor or by a stepper motor. It is of course possible, in one variant of the invention, to feed the carrier plate with powder from the bottom.

More particularly, according to the invention, the device 1 comprises two different sources of energy: an electron beam gun 11 and a laser source 12.

The laser source 12 is for example a $CO_2$ laser or a Nd:Yag laser which has a power equal to or greater than 500 W. The laser source 1 is moved by first displacement means in order to fuse a layer of powder according to the modelling data for the object and to a predefined fusion strategy for fabricating the object. For this purpose, the laser source 1 is connected to a control unit 13 for a moving-coil mirror 14 which allows the laser beam coming from the source 12 to be oriented and displaced with respect to the object 2 as a function of the information sent by the control unit 9. The laser beam can be moved by the control unit 9 at a speed of around 10 m/s.

The electron gun 11 comprises, in a known manner, a high-voltage circuit which produces the acceleration voltage for the electrons emitted by the emitting electrode of the gun which in turn is connected to a current source enabling it to be heated in order to generate the emission of electrons. The electron beam coming from the gun is oriented by deflection coils 16 with respect to the object 2 according to the information sent by the control unit 9. The device 1 also comprises beam conditioning coils 15 allowing the focusing of the electron beam with respect to the worked region of the object 2. The power of the electron gun is around 3000W and its beam can be moved at a speed of around 1000 m/s.

The components of the device 1 are arranged inside an air-tight chamber 17 connected to a vacuum pump 18 which maintains a vacuum of around $10^{-4}$-$10^{-6}$ mbar inside the chamber. Such a pressure level ensures a correct operation of the electron gun and allows the phenomenon of oxidation to be avoided when the selective fusion of the powder is carried out by the laser source. The vacuum pump 18 is chosen in such a manner that its throughput is sufficient to take into account the outgassing resulting from the thermal cycle together with a potential leak rate of the chamber 17.

The walls of the chamber 17 are preferably made of steel and are thick enough, the thickness of the walls being around 20 to 30 mm, in order to ensure the protection of the operator against X-rays. The chamber 17 furthermore comprises window ports (not shown) allowing the operator to view the various areas inside of the device, while at the same time providing a protection against the X-rays emitted by the electron gun and against the light radiation emitted by the laser source.

The control unit 9 controls the power supply and the energy sources, the supply of powder from the reservoir and the distribution by the distribution means or distributor of a layer of powder, together with the movement of the carrier plate. In one variant of the invention, the device additionally comprises means for measuring the temperature, such as an IR or CCD camera which are designed to communicate to the control unit information relating to the temperature of the layer of powder, and thus to allow the operating parameters of the electron gun or of the laser beam to be adjusted.

According to the invention, the electron beam 20 produced by the gun 11 is used to carry out the heat treatment of the layer of powder fused with the laser beam 19 produced by the source 12. The electron gun 11 is thus moved by second displacement means in order to heat a fused layer of powder according to modelling data for the object and according to curves of variation of the temperature with time predefined for each layer. More particularly, the heat treatment is carried out by directing the electron beam 20 with a predetermined power and at a pre-established speed over fused areas of the layer of powder in such a manner as to locally manage the variation of the temperature as a function of time and to obtain the desired mechanical properties for the corresponding section of the finished object. The power of the electron beam 20 and the interaction time with the fused region are chosen in such a manner as to obtain the required rate of rise in temperature, of holding the temperature or of cooling according to the curve of variation of the temperature as a function of time characteristic of the chosen treatment and material. The cooling takes place by heat conduction from the consolidated layer to the surface of the carrier plate 3, which is made of a conducting material, or to the previously consolidated layers constructed on the carrier plate 3. In one variant (not shown in the figures), a cooling circuit may be fitted within the device in such a manner that its conduits are brought into contact with the carrier plate 3 and/or with the object 2.

The device 1 also comprises a memory unit 25 in which data are stored relating to the temperature/time variation during the generation of each consolidated layer of the object. This memory 25 is connected to the control unit 9 which controls the focusing of the electron beam 20, its displacement and its power, in a continuous fashion, so as to obtain the curves of variation of the temperature as a function of time within each treated layer. In one variant of the invention, a finer regulation of the control of the beams can be implemented based on a monitoring of the temperature of the surface of the layer.

In a first variant embodiment of the invention (not shown in the drawings), the laser beam 19 performs the fusion of discrete areas of the layer of powder, the areas being situated at a distance from one another, and this is done according to a pre-established fusion strategy. The electron beam 20 is subsequently directed over the fused areas, and this is done so as to follow the fusion by laser beam.

Figure 2A:
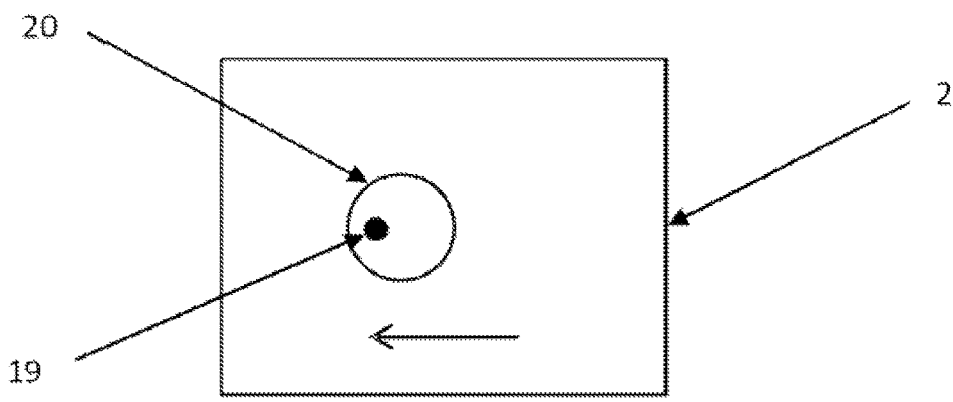
FIGS. 2A and 2B illustrate top views of the object showing schematically the impact areas of the two energy beams used with the device of an embodiment of the invention.
Figure 2B:
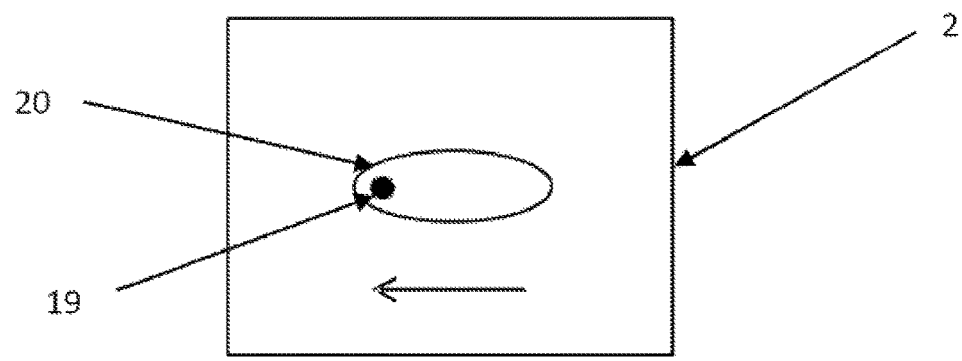

In a second variant embodiment of the invention and such as can be seen in FIGS. 2A and 2B, the laser beam 19 and the electron beam 20 are moved together by their respective displacement means, according to a pre-established common path. The focusing of the two beams is such that the area of the impact region of the electron beam 20 is greater than that of the laser beam 19. This allows a precise fusion to be obtained, with a tightly focused laser beam and, at the same time, a good management of the temperature of the fused region and around the latter with a wider electron beam. The positioning of the beams, with respect to one another, is such that the center of gravity of the impact area of the electron beam 20 is situated behind with respect to the center of gravity of the point of impact of the laser beam 19, according to the direction of travel of the beams with respect to the object 2, such as indicated by the arrows. Thus, by adjusting the intensity of each beam in such a manner as to obtain the fusion by laser beam and to manage the heating or the cooling of the fused region by electron beam, it is possible to obtain the desired properties in the layer in a continuous fashion, in step with the consolidation of the latter. This allows a good management of the temperature of the fused layer to be guaranteed, in a localized manner, just after the fusion by laser, and a tight control of the properties of the fused layer to be ensured, while also allowing the fabrication time for the object to be reduced.

The impact area of the electron beam 20 can have a circular shape (FIG. 2A), by adjusting the focal point to a predetermined distance above the surface of the layer of powder. For objects which require a greater precision for their shape and for their surface, extending on either side of the point of impact of the electron beam 20, the impact area can have an oblong shape (FIG. 2B), which may be obtained by adjusting the electron beam, for example by suitably controlling the coils 15 generating the focusing magnetic fields.

The powders used with the method of the invention are metal powders, such as powders of Ti, Ni—Ti, of superalloys, of aluminium alloys, of invar, of stainless steels, of CoCr, of maraging and of other metal powders, or ceramic powders. Depending on the geometry and the mechanical or surface characteristics of the object to be fabricated, and also on the thickness of the final layer targeted, the mean diameter of the particles of the powder can vary from a few microns, for example 5 μm, to 300 μm. Depending on the operating parameters of the energy beams used and on the powders used, the thickness of a layer of powder can vary from a few micrometers, for example 10 μm, to several hundreds of micrometers, for example 500 μm.

Figure 3:
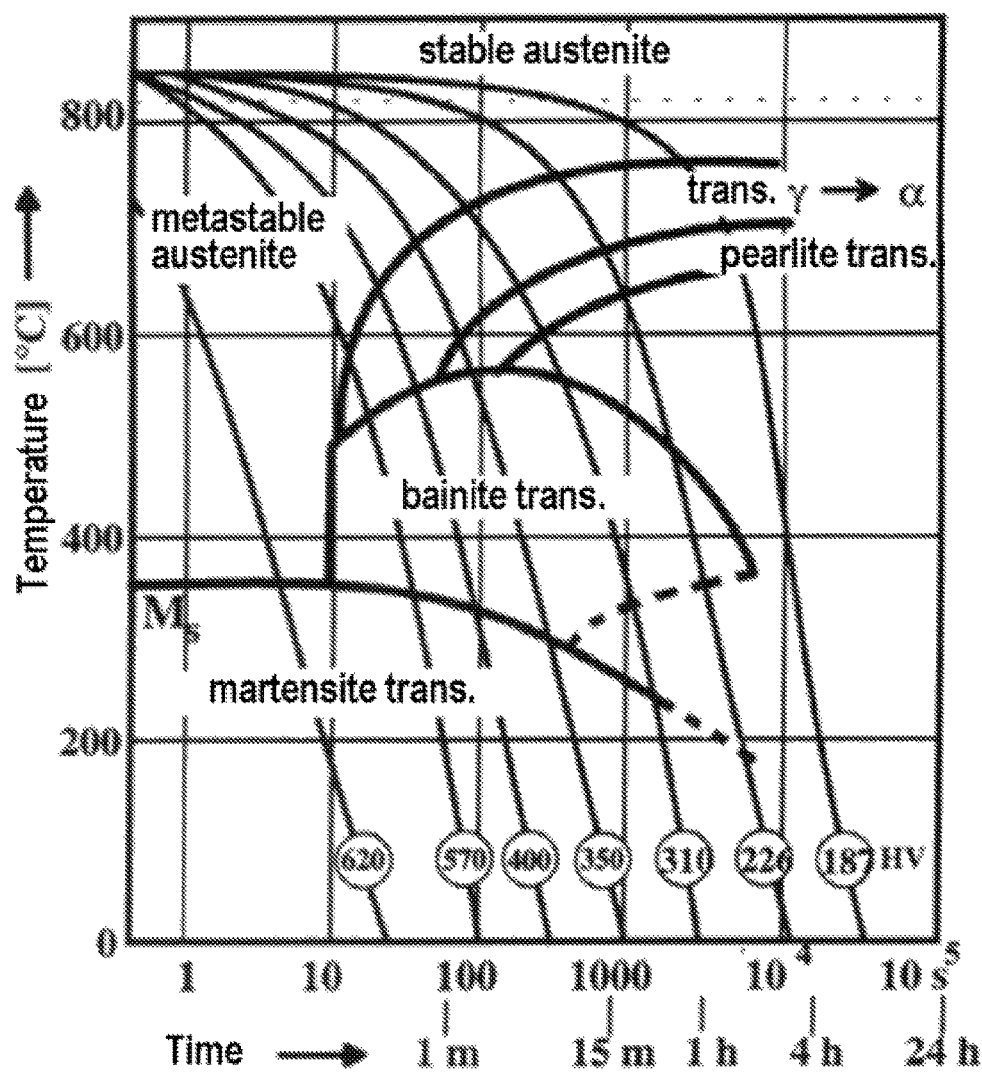
FIG. 3 illustrates a CCT diagram used with a first exemplary embodiment of the invention.
Figure 4:
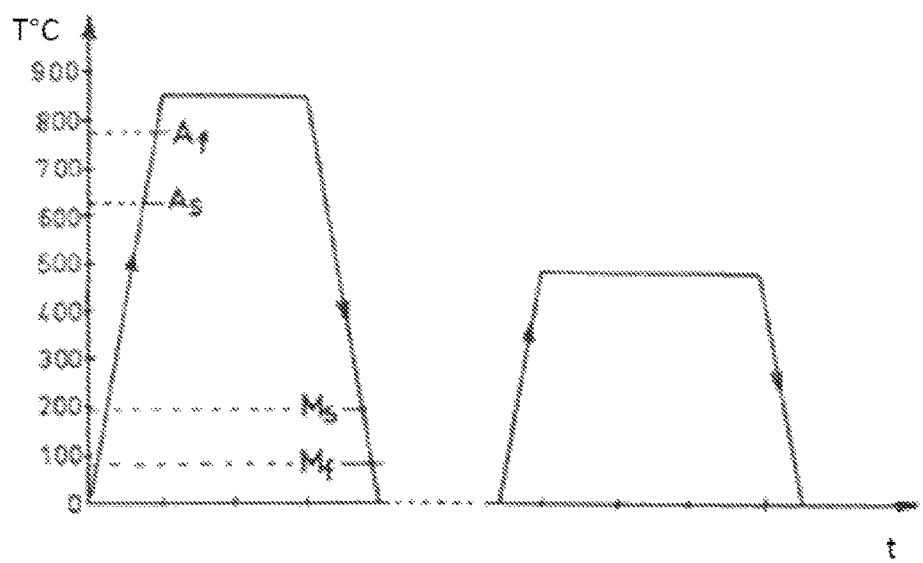
FIG. 4 is a curve illustrating the variation of the temperature as a function of time in the framework of a heat treatment according to a first exemplary embodiment of the invention.

FIG. 4 illustrates a first example of a heat treatment implemented with the device and according to the method of the invention. A layer of powder of maraging steel Fe—Ni at 18% Ni is deposited onto the carrier plate 3. The deposited layer is subsequently fused with the laser beam 19. The power and the speed of travel of the electron beam 20 are adjusted in such a manner that its displacement over the fused region of the layer can provide the variation of the temperature as a function of time according to the curves that can be seen in FIG. 4. Thus, the curve situated on the left-hand side of FIG. 4 is a quenching obtained by heating of the fused region up to the austenitization temperature, which heating is followed by holding at a constant temperature and subsequently by a cooling controlled in such a manner as to obtain a martensitic structure. FIG. 3 illustrates a CCT diagram, or Continuous Cooling Transformation diagram, which is used in the case of quenching cycles for the maraging steel in the example in order to estimate the optimum rate of cooling so as to obtain the desired microstructure. The curve Ms in this diagram determines the point of onset of the martensitic transformation for a chosen rate of cooling. On the curve on the left-hand side of FIG. 4, As and Af represent the points of onset, respectively of the end, of the austenitic transformation and Ms and Mf the points of onset, respectively of the end, of the martensitic transformation undergone by the treated layer. During the treatment being implemented, the electron beam heats the fused region of the layer up to a temperature near to but greater than Af, enables this temperature to be held for a predetermined time, then implements the cooling at a predetermined rate (chosen with the aid of the diagram in FIG. 3) in order to obtain a martensitic microstructure. The martensitic quenching is aimed at improving the tribological and mechanical properties of the treated material, notably its resistance to wear, to bending or to torsion.

The right-hand side of FIG. 4 is a tempering treatment which is carried out after the quenching. For this purpose, the power and the speed of the electron beam 20 are adjusted in such a manner that the variation of the temperature as a function of time in the region of the quenched layer follows the curve illustrated in FIG. 4. In the example of the maraging steel used, tempering is commonly used after the quenching in order to form precipitates and to increase the elasticity and the load at break.

The heat treatment carried out according to the curve on the right-hand side of FIG. 4 may also be applied to a layer fused by laser beam, without having carried out a prior quenching. This treatment helps to relieve the stresses in the fused layer.

Once the treatment has been carried out on the first fused layer, a new layer of powder is deposited on the preceding layer and the heat treatment is applied to the new fused layer which has adhered to the preceding layer. This is repeated layer by layer until the three-dimensional object 2 is obtained.

Figure 5:
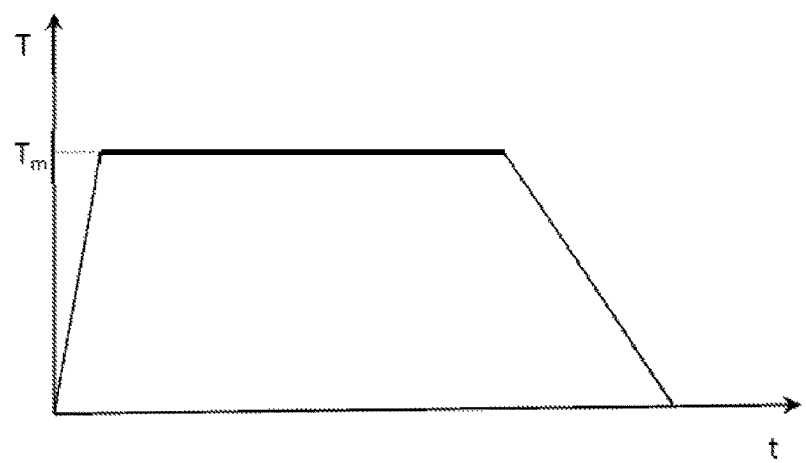
FIG. 5 is a curve illustrating the variation of the temperature as a function of time in the framework of a heat treatment according to a second exemplary embodiment of the invention.

FIG. 5 illustrates a second example of heat treatment carried out with the device and according to the method of the invention. A layer of powder of alloy based on Co alloyed with Cr is deposited on the carrier plate 3. The deposited layer is subsequently fused with the laser beam 19. The power and the speed of travel of the electron beam 20 are adjusted in such a manner that its displacement over the fused region of the layer can provide the variation of the temperature as a function of time according to the curve seen in FIG. 5. This consists of a heating up to a temperature $T_m$, which is around 800° C. in this example, of holding this for a predetermined period of time, followed by a cooling. The heating takes place faster than the cooling, the rate of heating being around twice that of cooling. The heat treatment carried out is a stabilization annealing which allows the stresses in the layer fused by the laser beam to be relieved and a consolidated layer with improved mechanical properties to be obtained.

Other variants and embodiments of the invention may be envisaged without straying from the framework of its claims. Thus, several electron beam sources may be used to carry out the pre-heating and/or several laser beam sources for carrying out the fusion of a layer of powder.

The invention claimed is:

1. A method for fabricating a three-dimensional object by successive consolidation, layer by layer, of selected regions of a layer of powder, the consolidated regions corresponding to successive sections of the three-dimensional object, comprising in order:
   a—depositing a layer of powder onto a support;
   b—fusing the layer of powder by a laser energy source so as to obtain a fused layer corresponding to a section of the object and exhibiting a first state of its mechanical properties;
   c—heating at least a part of the fused layer by an electron beam energy source to a temperature which follows a controlled variation over time so as to modify the first state of the fused layer and to obtain a consolidated layer exhibiting a second state of mechanical properties, wherein the second state of mechanical properties are different than the first state of mechanical properties; and
   d—repeating the preceding steps until several superposed consolidated layers form the object;
   wherein an electron beam from the electron beam energy source has a larger cross-section than a laser beam from the laser energy source; and
   wherein the cross-section of the electron beam is oblong.

2. The method according to claim 1, wherein the heating by electron beam performs a heat treatment in the solid phase of the fused layer which is selected from the group consisting of, taken alone or in combination: stabilization annealing, tempering, and quenching.

3. The method according to claim 1, wherein the electron beam has a power and a speed of travel with respect to the object to be fabricated that are chosen according to the material of the latter.

4. The method according to claim 1, further comprising continuously controlling focusing of the electron beam, its displacement, and its power.

5. The method according to claim 1, wherein the electron and laser beams move simultaneously over a common path, wherein the laser beam is in advance with respect to the electron beam, as seen in a direction of displacement of the beams with respect to the object to be fabricated.

6. The method according to claim 5, wherein a center of an impact area of the electron beam is situated behind with respect to a center of an impact area of the laser beam, as seen in the direction of the displacement of the said beams with respect to the object.

7. The method according to claim 1, wherein the laser beam and the electron beam have a power and diameter that are adjustable.

8. The method according to claim 1, wherein the powder is a metal powder.

9. The method according to claim 1, wherein the three-dimensional object is a mold or a part of a mold for the fabrication of a tire.

10. The method according to claim 1 wherein the step of heating at least a part of the fused layer further includes heating an outer periphery of the fused layer and annealing the outer periphery to put the outer periphery of the fused layer under compression.

11. The method according to claim 1 wherein the electron beam source is more powerful than the laser energy source.

12. The method according to claim 1 wherein an electron beam from the electron beam energy source has a larger cross-section than a laser beam from the laser energy source.

13. The method of claim 1, wherein the steps of fusing and heating are at least partially simultaneous.

* * * * *